(12) United States Patent
Tian

(10) Patent No.: US 12,127,141 B2
(45) Date of Patent: Oct. 22, 2024

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Wenqiang Tian, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 271 days.

(21) Appl. No.: 17/733,900

(22) Filed: Apr. 29, 2022

(65) Prior Publication Data

US 2022/0256489 A1 Aug. 11, 2022

Related U.S. Application Data

(63) Continuation of application No. PCT/CN2019/115818, filed on Nov. 5, 2019.

(51) Int. Cl.
*H04W 56/00* (2009.01)
*H04W 16/28* (2009.01)
*H04W 74/0816* (2024.01)

(52) U.S. Cl.
CPC ......... *H04W 56/001* (2013.01); *H04W 16/28* (2013.01); *H04W 74/0816* (2013.01)

(58) Field of Classification Search
CPC .............. H04W 56/001; H04W 16/28; H04W 74/0816
See application file for complete search history.

(56) References Cited

U.S. PATENT DOCUMENTS

2019/0313440 A1* 10/2019 John Wilson ........ H04B 7/0695
2020/0337002 A1* 10/2020 Ko ........................ H04L 5/0016

FOREIGN PATENT DOCUMENTS

| CN | 110249582 A | 9/2019 |
| EP | 3471318 A1 | 4/2019 |
| WO | 2019137509 A1 | 7/2019 |
| WO | 2019160331 A1 | 8/2019 |

(Continued)

OTHER PUBLICATIONS

Examination Report for European Application No. 19951409.2 Issued Jan. 15, 2024, 7 Pages.

(Continued)

*Primary Examiner* — Duc C Ho
(74) *Attorney, Agent, or Firm* — PERKINS COIE LLP

(57) ABSTRACT

The implementations of the present disclosure relate to a wireless communication method and a terminal device, capable of effectively determining the QCL relationship of SSB. The wireless communication method includes: a terminal device receives first indication information and second indication information from a network device, the first indication information being used for indicating a first number Q1 and the second indication information being used for indicating a second number Q2; the terminal device determines target indication information from amongst the first indication information and the second indication information and, on the basis of the target indication information, determines the quasi co-location QCL relationship between the synchronization signal blocks SSB of a serving cell of the terminal device.

20 Claims, 3 Drawing Sheets

A terminal device receives first indication information and second indication information from a network device, the first indication information is used for indicating a first number Q1 and the second indication information is used for indicating a second number Q2 ⟶ 210

The terminal device determines target indication information from the first indication information and the second indication information, and determines a Quasi Co-Located (QCL) relationship between SSBs of a serving cell of the terminal device according to the target indication information ⟶ 220

(56) References Cited

FOREIGN PATENT DOCUMENTS

WO   2019179261 A1   9/2019
WO   2019194725 A1   10/2019

OTHER PUBLICATIONS

Examination Report for Indian Application No. 202217031533 issued Nov. 21, 2022. 7 pages with English translation.
Extended European Search Report for European Application No. 19951409.2 issued Oct. 31, 2022. 9 pages.
Spreadtrum Communications "Discussion on initial access and mobility in NR-U" R1-1910015; 3GPP TSG RAN WG1 Meeting #98bis; Chongqing, China; Oct. 14-20, 2019. 15 pages.
Examination Report for European Application No. 19951409.2 issued on Jul. 7, 2023. 6 pages.
First Office Action of Chinese Application No. 202210632061.4 issued on Jun. 30, 2023. 15 pages with English translation.
International Search Report Mailed Jul. 24, 2020 In Application No. PCT/CN2019/115818.
VIVO, Discussion on initial access procedure for NR-U, 3GPP TSG RAN WG1 #98bis, R1-1910205, Chongqing, China, Oct. 14-20, 2019, 8 pages.
Ericsson, Enhancements to initial access procedure, 3GPP TSG RAN WG1 Meeting #98 bis, R1 1910948, Chongqing, China, Oct. 14-20, 2019, 15 pages.
Charter Communications, Feature lead summary 1 of Enhancements to initial access procedure, GPP TSG RAN WG1 Meeting #98BIS, R1 1911286, Chongqing, P.R. China, Oct. 14-20, 2019, 17 pages.
Examination Report for European Application No. 19951409.2 Issued on Jul. 12, 2024, 6 Pages.

\* cited by examiner

WIRELESS COMMUNICATION METHOD AND TERMINAL DEVICE

CROSS-REFERENCE TO RELATED APPLICATION

The present application is a continuation application of International PCT Application No. PCT/CN2019/115818, filed on Nov. 5, 2019, the entire content of which is hereby incorporated by reference.

TECHNICAL FIELD

The present disclosure relates to the field of communication, and more particularly, to a wireless communication method and a terminal device.

BACKGROUND

Data transmission on an unlicensed spectrum is supported in a New Radio (NR) system, when performing communication on the unlicensed spectrum, a communication device needs to follow a principle of Listen Before Talk (LBT), that is, before sending a signal on a channel of the unlicensed spectrum, the communication device needs to perform channel sensing (or referred to as channel listening) first, and the communication device can send a signal only when a result of channel sensing is that the channel is idle. If the result of channel sensing by the communication device on a channel of the unlicensed spectrum is that the channel is busy, the communication device cannot send any signal.

During cell measurement, a terminal device may perform filtering processing on Synchronization Signal/PBCH Blocks (SSBs or SS/PBCH Blocks) with a Quasi Co-Located (QCL) relationship. Therefore, how to determine a QCL relationship of SSBs in an unlicensed spectrum by a terminal device to complete filtering and other operations is an urgent problem to be solved.

SUMMARY

Implementations of the present disclosure provide a wireless communication method and a terminal device, capable of determining a QCL relationship of SSBs.

In a first aspect, there is provided a wireless communication method, including: receiving, by a terminal device, first indication information and second indication information from a network device, wherein the first indication information is used for indicating a first number Q1 and the second indication information is used for indicating a second number Q2; and determining, by the terminal device, target indication information from the first indication information and the second indication information, and determining a Quasi Co-Located (QCL) relationship between Synchronization Signal Blocks (SSBs) of a serving cell of the terminal device according to the target indication information.

In a second aspect, there is provided a terminal device, including: a communication unit, configured to receive first indication information and second indication information from a network device, wherein the first indication information is used for indicating a first number Q1 and the second indication information is used for indicating a second number Q2; and a processing unit, configured to determine target indication information from the first indication information and the second indication information, and determine a Quasi Co-Located (QCL) relationship between Synchronization Signal Blocks (SSBs) of a serving cell of the terminal device according to the target indication information.

In a third aspect, there is provided a terminal device, which includes a processor and a memory. The memory is configured to store a computer program, and the processor is configured to call and run the computer program stored in the memory to perform the method in the first aspect or in various implementations thereof.

In a fourth aspect, there is provided an apparatus, configured to implement the method in the above first aspect or in various implementation modes thereof.

Specifically, the apparatus includes a processor configured to call and run a computer program from a memory to enable a device with the apparatus installed to perform the method in the above first aspect or in various implementation modes thereof.

Optionally, the apparatus may be a chip.

In a fifth aspect, there is provided a computer readable storage medium, configured to store a computer program, wherein the computer program enables a computer to perform the method in the above first aspect or in various implementation modes thereof.

In a sixth aspect, there is provided a computer program product, including computer program instructions, wherein the computer program instructions enable a computer to perform the method in the above first aspect or in various implementation modes thereof.

In a seventh aspect, there is provided a computer program, which, when running on a computer, enables the computer to perform the method in the above first aspect or in various implementation modes thereof.

According to the above technical solutions, when a terminal device obtains two pieces of indication information through different ways or processes, the two pieces of indication information are used for determining a number used for determining a QCL relationship between SSBs of a serving cell, the terminal device may determine target indication information from the two pieces of indication information, thus effectively determining a number effectively used for determining a QCL relationship of SSBs and further determining the QCL relationship between the SSBs.

DETAILED DESCRIPTION

Technical solutions in implementations of the present disclosure will be described below with reference to the drawings in the implementations of the present disclosure. It is apparent that the implementations described are just a part of implementations of the present disclosure, but not all of the implementations of the present disclosure. According to the implementations of the present disclosure, all other implementations achieved by a person of ordinary skill in the art without making inventive efforts belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system, or another communication system, etc.

Figure 1:
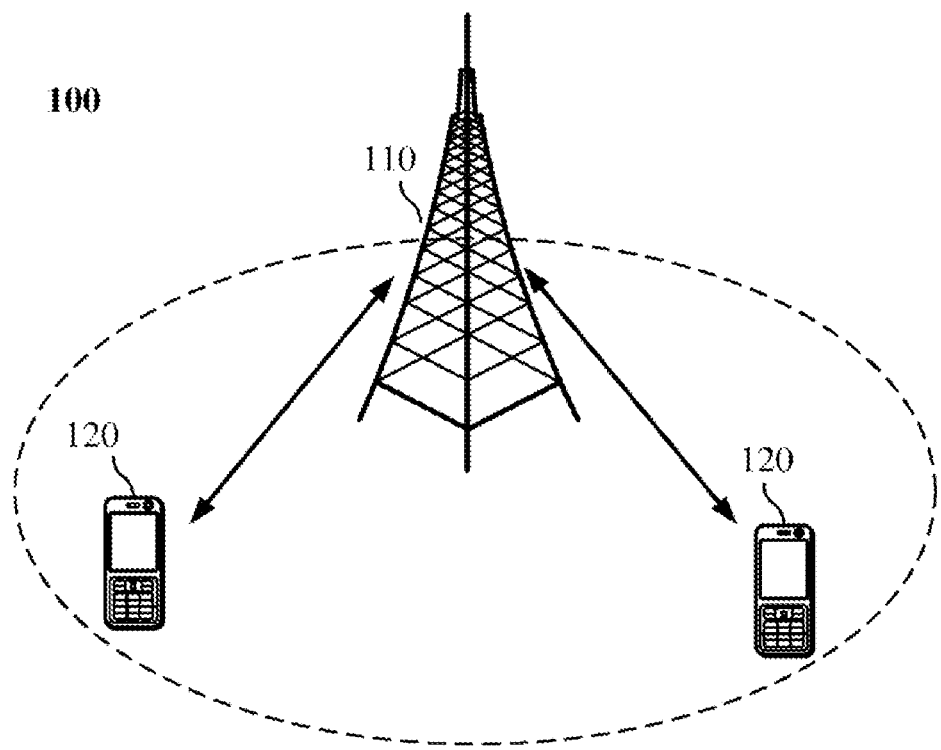
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

FIG. 1 illustrates one network device and two terminal devices. Optionally, the communication system 100 may include multiple network devices, and other quantity of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

The unlicensed spectrum is a spectrum that may be used for radio device communication divided by countries and regions. The spectrum may be considered as a shared spectrum, that is, communication devices in different communication systems may use the spectrum, and may not apply for exclusive spectrum authorization from a government, as long as they meet a regulatory requirement on the spectrum set by the countries or the regions. In order to enable various communication systems using an unlicensed spectrum for wireless communication to coexist friendly on a spectrum, a principle of Listen Before Talk (LBT) needs to be based, that is, before a communication device sends a signal on a channel of the unlicensed spectrum, channel sensing (or referred to as channel detection) needs to be performed first, and only when a result of channel sensing is that the channel is idle, can the communication device send the signal. If the result of channel sensing performed by the communication device on the unlicensed spectrum is that the channel is busy, the signal cannot be sent. And in order to ensure fairness, in one transmission, a duration of signal transmission performed by the communication device using the channel on the unlicensed spectrum may not exceed Maximum Channel Occupation Time (MCOT).

It may be seen that since channel resources on an unlicensed spectrum are shared, and when using these shared resources, a communication device needs to listen to an idle channel first before it can make use of the listened idle channel. In this case, since a location where LBT of the communication device succeeds is unpredictable, if LBT fails, it will cause transmission failure or reception failure of SSBs, so it is difficult to guarantee fixed locations of periodic transmission and reception of SSBs.

Figure 2:
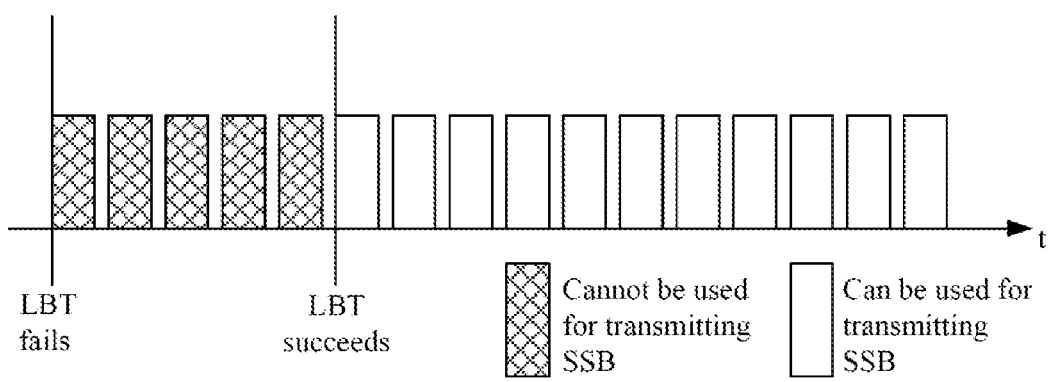
FIG. 2 is a schematic diagram of an influence of failure of LBT on transmission of SSBs according to an implementation of the present disclosure.

In view of this, in NR-Based Access to Unlicensed Spectrum (NR-U), a solution of providing multiple candidate locations for SSB transmission is put forward, so that there are still enough candidate locations for SSB transmission after LBT of a terminal device succeeds, so as to avoid an influence of failure of LBT on SSB reception. As shown in FIG. 2, 16 candidate locations for SSB transmission are pre-configured, and a communication device fails in performing LBT for a first time. After that, the communication device performs LBT for a second time, and LBT succeeds. Therefore, candidate locations for SSB transmission after the second LBT may be used for SSB transmission, and candidate locations for SSB transmission between the first LBT and the second LBT cannot be used for SSB transmission, that is, at most 9 SSBs may be transmitted on these 16 candidate locations for SSB transmission.

When a terminal device performs cell measurement, filtering may be performed on SSBs with a QCL relationship. If filtering is performed on SSBs without a QCL relationship, a result obtained after filtering is performed on the SSBs is meaningless.

At present, on a licensed spectrum, SSBs with a same SSB number have a QCL relationship. That is to say, during cell measurement, a terminal device may filter SSBs with a same SSB number to obtain a measurement result of a beam level. However, for SSBs with different numbers, the terminal device considers that there is no QCL relationship among them, so the terminal device may treat SSBs with different numbers as different beams.

In order to carry out measurement operations such as filtering to ensure an accuracy of cell measurement, how a terminal device determines a QCL relationship of SSBs on an unlicensed spectrum is an urgent problem to be solved.

In view of this, an implementation of the present disclosure proposes a wireless communication method, which may effectively determine a QCL relationship of SSBs.

Figure 3:
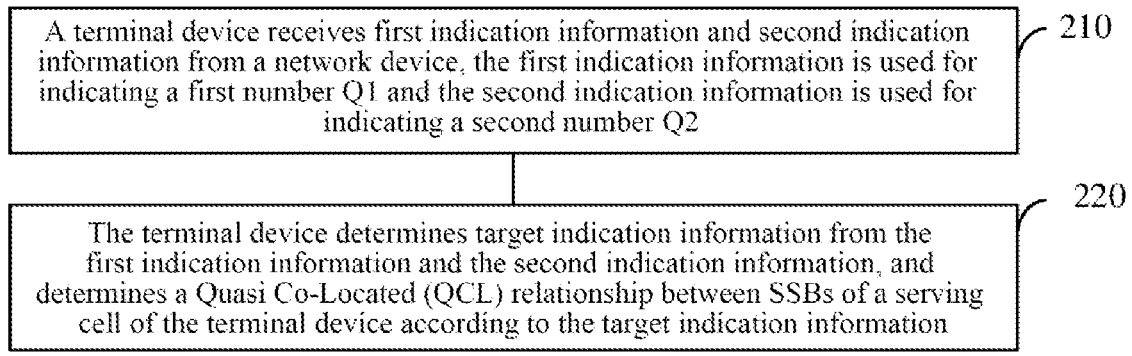
FIG. 3 is a schematic diagram of a wireless communication method according to an implementation of the present disclosure.

FIG. 3 is a schematic flowchart of a wireless communication method 200 according to an implementation of the present disclosure. The method shown in FIG. 3 may be performed by a terminal device. The terminal device may be, for example, the terminal device 120 shown in FIG. 1. As shown in FIG. 3, the method 200 may include at least part of the following contents.

In 210, a terminal device receives first indication information and second indication information from a network device, the first indication information is used for indicating a first number Q1 and the second indication information is used for indicating a second number Q2.

In 220, the terminal device determines target indication information from the first indication information and the second indication information, and determines a Quasi Co-Located (QCL) relationship between SSBs of a serving cell of the terminal device according to the target indication information.

Q1 and Q2 may be used for determining the QCL relationship between SSBs of the serving cell. Q1 and Q2 may be used not only for determining the QCL relationship between SSBs of the serving cell, but also for determining a QCL relationship between other synchronization signals of the serving cell. For example, Q1 and Q2 may be used for determining a Channel State Information-Reference Signal (CSI-RS).

Optionally, in an implementation of the present disclosure, Q1 may be equal to Q2.

Optionally, in an implementation of the present disclosure, Q1 may not be equal to Q2.

For convenience of description, a number indicated through the target indication information is called Q, that is, Q is a valid number for finally determining the QCL relationship between SSBs of the serving cell. For example, if the target indication information determined by the terminal device is Q1, then Q=Q1.

The network device may indicate Q to the terminal device in various ways. For example, the network device may indicate Q (a cell level) that may be used by the serving cell to the terminal device, through a Master Information Block (MIB).

For another example, the network device may indicate Q (a cell level) that may be used by the serving cell, through a System Information Block (SIB) 1.

For another example, the network device may indicate Q (a frequency point level) used by a frequency point where the serving cell is located, through SIB1.

For another example, the network device may indicate Q (a cell level) that may be used by the serving cell, through SIB2.

For another example, the network device may indicate Q (a frequency point level) used by a frequency point where the serving cell is located, through SIB2.

For another example, the network device may indicate Q (a cell level) that may be used by the serving cell, through SIB3, when the terminal device performs intra-frequency cell reselection.

For another example, the network device may indicate Q (a frequency point level) used by a frequency point where the serving cell is located, through SIB3, when the terminal device performs intra-frequency cell reselection.

For another example, the network device may indicate Q (a cell level) that may be used by the serving cell, through a Radio Resource Control (RRC) reconfiguration message.

For another example, the network device may indicate Q (a frequency point level) that may be used by a frequency point where the serving cell is located, through an RRC reconfiguration message.

The network device may determine Q before indicating the Q to the terminal device. It should be understood that in an implementation of the present disclosure, a specific implementation mode of determining Q by the network device is not limited. Illustratively, Q may be preset on the network device according to a protocol.

It should be noted that when the terminal device obtains an indicated number (a cell level) that may be used by the serving cell through the above-mentioned various ways, the terminal device expects to obtain a same indicated number that may be used by the serving cell through different ways. That is to say, the terminal device does not expect to obtain different indicated numbers Q that may be used by the serving cell through different ways. Similarly, when the terminal device obtains an indicated number (a frequency point level) that may be used by a frequency point where the serving cell is located through the above-mentioned various ways, the terminal device expects to obtain a same indicated number that may be used by a frequency point where the serving cell is located through different ways.

In a possible implementation, if levels of Q1 and Q2 are the same, that is, both Q1 and Q2 are of a frequency point level or a cell level, and Q1=Q2, the terminal device may determine Q1 or Q2 as Q.

In another possible implementation, levels of Q1 or Q2 may be different, for example, Q1 is a number that may be used by a serving cell, and Q2 is a number that may be used by a frequency point where a serving cell is located. In this case, the terminal device may determine target indication information from the first indication information and the second indication information according to a first rule.

It is described in following four implementations in detail how the terminal device determines the target indication information from the first indication information and the second indication information according to the first rule.

Implementation 1

A first rule may be: when a network device indicates a first number Q1 that may be used by a serving cell to a terminal device through a MIB or SIB1, and indicates a second number Q2 that may be used by a frequency point where the serving cell is located to the terminal device through SIB2 or SIB3, target indication information may be first indication information carried in the MIB or SIB1, and Q=Q1.

Optionally, the first rule may be used for intra-frequency cell reselection. For example, the first rule may be used for making a QCL assumption for SSBs of the serving cell according to Q1 during intra-frequency cell reselection.

A technical solution of Implementation 1 is equivalent to that a terminal device obtains a first number Q1 of a cell level through a MIB or SIB1. When the terminal device needs to perform intra-frequency cell reselection, the terminal device obtains a parameter related to the intra-frequency cell reselection from SIB2 or SIB3, and the parameter related to the intra-frequency cell reselection may include but is not limited to a second number Q2 of a frequency point level for the intra-frequency cell reselection. At this time, after considering characteristics of other intra-frequency cells, a network device indicates Q2 which may be used by various cells to the terminal device. Since Q1 is an actual number that may be used by a current serving cell, and Q2 is a number of the frequency point level considered, Q2 may not be equal to Q1. In this case, Q1 is a more accurate number for a serving cell. Therefore, the terminal device may take Q1 as a valid number for a serving cell.

Implementation 2

A first rule may be: when a network device indicates a first number Q1 that may be used by a serving cell to a terminal device through a MIB or SIB1, and indicates a second number Q2 that may be used by a frequency point where the serving cell is located to the terminal device through SIB2 or SIB3, target indication information may be second indication information carried in the SIB2 or SIB1, and Q=Q2.

Optionally, the first rule may be used for intra-frequency cell reselection. For example, the first rule may be used for making a QCL assumption for SSBs of the serving cell according to Q2 during intra-frequency cell reselection.

A technical solution of Implementation 2 is equivalent to that a terminal device obtains a first number Q1 of a cell level through a MIB or SIB1. When the terminal device needs to perform intra-frequency cell reselection, the terminal device obtains a parameter related to the intra-frequency cell reselection from SIB2 or SIB3, and the parameter related to the intra-frequency cell reselection may include but is not limited to a second number Q2 of a frequency point level for the intra-frequency cell reselection. In this case, in order to ensure that a same number is used for all cells during intra-frequency cell reselection, and to ensure fairness of intra-frequency cell reselection performed for all cells, for the serving cell, the terminal device may use Q2 as a valid number that may be used by the serving cell when performing intra-frequency cell reselection.

Optionally, the terminal device may use Q1 in other processes of the serving cell, for example, the terminal device may use Q1 in a radio link management process.

Implementation 3

A first rule may be: when a network device indicates a first number Q1 that may be used by a serving cell to a terminal device through a MIB or SIB1, and indicates a second number Q2 that may be used by a frequency point where the serving cell is located to the terminal device through an RRC reconfiguration message, target indication information may be first indication information carried in the MIB or SIB1, and Q=Q1.

Optionally, the network device may be through measurement object configure information, or the RRC reconfiguration message may be measurement reporting configuration information.

Optionally, the first rule may be used for intra-frequency cell measurement. For example, the first rule may be used for making a QCL assumption for SSBs of the serving cell according to Q1 during intra-frequency cell measurement.

A technical solution of Implementation 3 is equivalent to that a terminal device obtains a first number Q1 of a cell level through a MIB or SIB1. When the terminal device needs to perform intra-frequency cell measurement, the terminal device obtains a parameter related to the intra-frequency cell measurement from an RRC reconfiguration message, and the parameter related to the intra-frequency cell measurement may include but is not limited to a second number Q2 of a frequency point level for the intra-frequency cell measurement. At this time, after considering characteristics of other intra-frequency cells, a network device indicates Q2 which may be used by various cells to the terminal device. Since Q1 is an actual number that may be used by a current serving cell, and Q2 is a number of the frequency point level considered, Q2 may not be equal to Q1. In this case, Q1 is a more accurate number for a serving cell. Therefore, the terminal device may take Q1 as a valid number for a serving cell.

Implementation 4

A first rule may be: when a network device indicates a first number Q1 that may be used by a serving cell to a terminal device through a MIB or SIB1, and indicates a second number Q2 that may be used by a frequency point where the serving cell is located to the terminal device through an RRC reconfiguration message, target indication information may be second indication information carried in the RRC reconfiguration message, and Q=Q2.

Optionally, the first rule may be used for intra-frequency cell measurement. For example, the first rule may be used for making a QCL assumption for SSBs of the serving cell according to Q2 during intra-frequency cell measurement.

A technical solution of Implementation 4 is equivalent to that a terminal device obtains a first number Q1 of a cell level through a MIB or SIB1. When the terminal device needs to perform intra-frequency cell measurement, the terminal device obtains a parameter related to the intra-frequency cell measurement from an RRC reconfiguration message, and the parameter related to the intra-frequency cell measurement may include but is not limited to a second number Q2 of a frequency point level for the intra-frequency cell measurement. In this case, in order to ensure that a same number is used for all cells during intra-frequency cell measurement, and to ensure fairness of intra-frequency cell measurement performed for all cells, for the serving cell, the terminal device may use Q2 as a valid number that may be used by the serving cell when performing intra-frequency cell measurement.

Optionally, Q1 may be used in other processes of the serving cell, for example, the terminal device may use Q1 in a radio link management process.

After the terminal device determines the target indication information, that is, determines Q, the terminal device may determine a QCL relationship among multiple SSBs of the serving cell based on the Q.

Specifically, when the terminal device detects two SSBs with numbers of M1 and M2 respectively, if M1 mod Q=M2 mod Q, the terminal device may confirm that there is a QCL relationship between the two SSBs.

Figure 4:
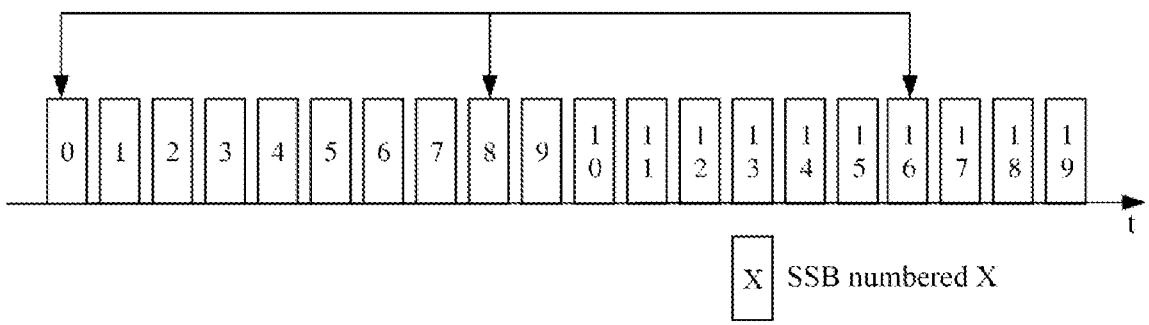
FIG. 4 is a schematic diagram of a QCL relationship between SSBs according to an implementation of the present disclosure.

The following is an example with reference to FIG. 4. There are 20 SSBs in FIG. 4, numbered 0, 1, 2, . . . , 19 respectively, and Q=8. In this case, there is a QCL relationship among SSB numbered 0, SSB numbered 8, and SSB numbered 16. There is a QCL relationship among SSB numbered 1, SSB numbered 9, and SSB numbered 17.

Optionally, a number of an SSB may be an order of the SSB in an SSB set in a time domain. The SSB set may include SSBs of a same serving cell or SSBs of multiple serving cells.

Optionally, a number of an SSB may be an order of the SSB in a time domain among SSBs belonging to a same serving cell.

It should be understood that in an implementation of the present disclosure, the terms "first" and "second" are only for distinguishing between different objects, but do not constitute a limit on the scope of an implementation of the present disclosure.

It should also be understood that the implementations of the present disclosure only show that the network device indicates a number used for determining a QCL relationship between SSBs to the terminal device in two ways, but the present disclosure is not limited thereto. The network device may indicate a number used for determining a QCL relationship between SSBs to the terminal device in three or more ways. At this time, the terminal device may determine target indication information among multiple pieces of indication information according to the first rule, that is, determine a number finally used for determining a QCL relationship between SSBs from multiple numbers used for determining a QCL relationship between SSBs.

According to an implementation of the present disclosure, when the terminal device receives two pieces of indication information indicating a number for determining a QCL relationship between SSBs of a serving cell, the terminal device may determine target indication information from the two pieces of indication information based on the first rule, so that a number effectively used for determining a QCL relationship of SSBs may be effectively determined. Only when the number effectively used for determining the QCL relationship of SSBs is determined, can the terminal device complete measurement operations such as filtering on an unlicensed spectrum, thus ensuring accuracies of cell reselection and cell measurement.

The preferred implementations of the present disclosure have been described in detail above with reference to the accompanying drawings. However, the present disclosure is not limited to specific details of the implementations described above, and multiple kinds of simple variations may be made to the technical solutions of the present disclosure within the technical conception scope of the present disclosure, and these simple variations are all within the protection scope of the present disclosure.

For example, various specific technical features described in the specific implementations described above may be combined in any suitable mode without conflict. In order to avoid unnecessary repetition, various possible combinations will not be further explained in the present disclosure.

For another example, various different implementations of the present disclosure may also be combined arbitrarily with each other, as long as they do not violate the idea of the present disclosure, and the combinations should be regarded as the contents disclosed in the present disclosure as well.

It should be understood that sequence numbers of the foregoing processes do not mean execution sequences in various method implementations of the present disclosure. The execution sequences of the processes should be determined according to functions and internal logics of the processes, and should not constitute any limitation on the implementation processes of the implementations of the present disclosure.

The wireless communication method according to an implementation of the present disclosure has been described in detail above, and communication apparatuses according to implementations of the present disclosure will be described below in combination with FIGS. 5 and 6. Technical features described in method implementations are applicable to following apparatus implementations.

Figure 5:
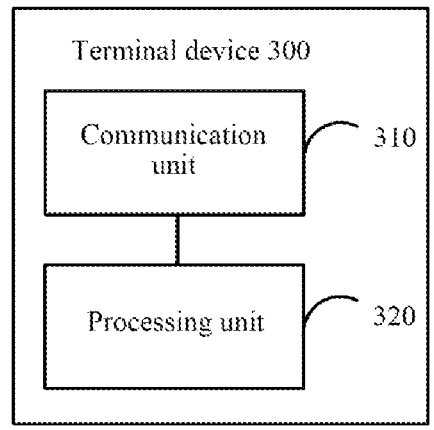
FIG. 5 is a schematic block diagram of a terminal device according to an implementation of the present disclosure.

FIG. 5 shows a schematic block diagram of a terminal device 300 according to an implementation of the present disclosure. As shown in FIG. 5, a terminal device 300 includes a communication unit 310 and a processing unit 320.

The communication unit 310 is configured to receive first indication information and second indication information from a network device, wherein the first indication information is used for indicating a first number Q1 and the second indication information is used for indicating a second number Q2.

The processing unit 320 is configured to determine target indication information from the first indication information and the second indication information, and determine a Quasi Co-Located (QCL) relationship between Synchronization Signal Blocks (SSBs) of a serving cell of the terminal device according to the target indication information.

Optionally, in an implementation of the present disclosure, Q1 is used for indicating a number that may be used by the serving cell, and Q2 is used for indicating a number that may be used by a frequency point where the serving cell is located.

Optionally, in an implementation of the present disclosure, the processing unit 320 is specifically configured to determine the first indication information as the target indication information.

Optionally, in an implementation of the present disclosure, the processing unit 320 is specifically configured to determine the second indication information as the target indication information.

Optionally, in an implementation of the present disclosure, the first indication information is carried in a Master Information Block (MIB) or System Information Block (SIB) 1, and the second indication information is carried in a SIB2 or SIB3.

Optionally, in an implementation of the present disclosure, the first indication information is carried in an MIB or a SIB1, and the second indication information is carried in a Radio Resource Control (RRC) reconfiguration message.

Optionally, in an implementation of the present disclosure, the processing unit 320 is specifically configured to determine that there is a QCL relationship between SSBs of the serving cell when the SSBs of the serving cell satisfy a following formula.

$$M1 \bmod(Q) = M2 \bmod(Q)$$

M1 and M2 are numbers of different SSBs of the serving cell, and Q is a number indicated through the target indication information.

It should be understood that the terminal device 300 may correspond to the terminal device in the method 200, and may implement corresponding operations of the terminal device in the method 200, which will not be repeated herein for brevity.

Figure 6:
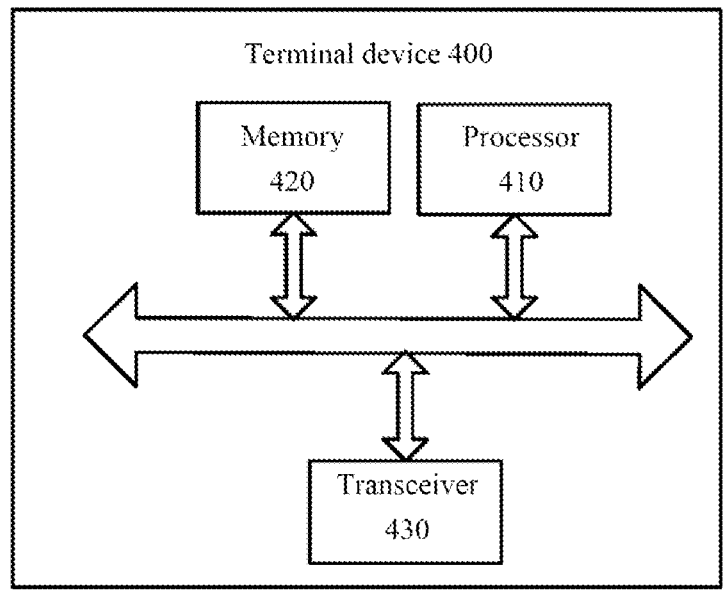
FIG. 6 is a schematic block diagram of a terminal device according to an implementation of the present disclosure.

FIG. 6 is a schematic diagram of a structure of a terminal device 400 according to an implementation of the present disclosure. The terminal device 400 shown in FIG. 6 includes a processor 410. The processor 410 may call and run a computer program from a memory to implement the method in implementations of the present disclosure.

Optionally, as shown in FIG. 6, the terminal device 400 may further include a memory 420. Herein, the processor 410 may call and run a computer program from the memory 420 to implement the methods in the implementations of the present disclosure.

Herein, the memory 420 may be a separate device independent of the processor 410, or may be integrated in the processor 410.

Optionally, as shown in FIG. 6, the terminal device 400 may further include a transceiver 430, and the processor 410 may control the transceiver 430 to communicate with other devices. Specifically, the transceiver 630 may send information or data to other devices or receive information or data sent by other devices.

Herein, the transceiver 430 may include a transmitter and a receiver. The transceiver 430 may further include antennas, a quantity of which may be one or more.

Optionally, the terminal device 400 may be specifically a terminal device of an implementation of the present disclosure, and the terminal device 400 may implement the corresponding processes implemented by the mobile terminal/terminal device in the various methods of implementations of the present disclosure, which will not be repeated here for brevity.

It should be understood that the above functions of the communication unit 310 may be achieved through a communication interface or transceiver, and the above functions of the processing unit 320 may be achieved through a processor.

Figure 7:
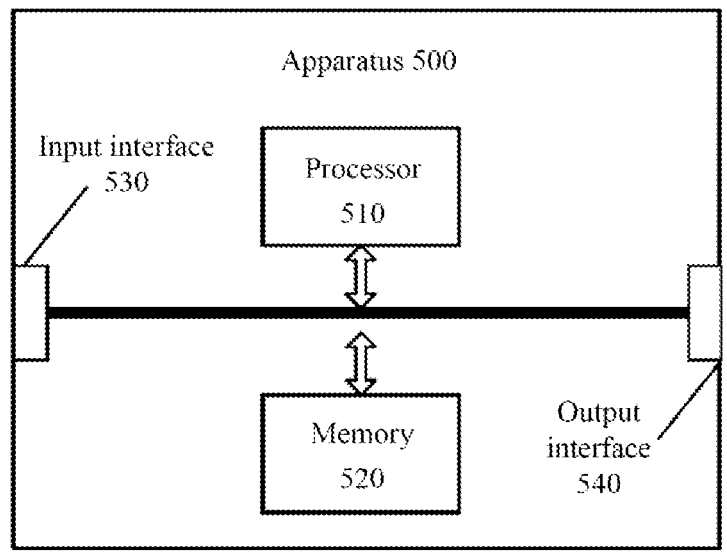
FIG. 7 is a schematic block diagram of an apparatus according to an implementation of the present disclosure.

FIG. 7 is a schematic diagram of a structure of an apparatus according to an implementation of the present disclosure. The apparatus 500 shown in FIG. 7 includes a processor 510. The processor 510 may call and run a computer program from a memory to implement the methods in the implementations of the present disclosure.

Optionally, as shown in FIG. 7, the apparatus 500 may further include a memory 520. Herein, the processor 510 may call and run a computer program from the memory 520 to implement the methods in the implementations of the present disclosure.

Herein, the memory 520 may be a separate device independent of the processor 510, or may be integrated in the processor 510.

Optionally, the apparatus 500 may further include an input interface 530. Herein, the processor 510 may control the input interface 530 to communicate with other devices or chips. Specifically, the processor 710 may acquire information or data sent by other devices or chips.

Optionally, the apparatus 500 may further include an output interface 540. Herein, the processor 510 may control the output interface 540 to communicate with other devices or chips. Specifically, the processor 710 may output information or data to other devices or chips.

Optionally, the apparatus may be applied to the terminal device in the implementations of the present disclosure, and the apparatus may implement the corresponding processes implemented by the terminal device in various methods according to the implementations of the present disclosure, which will not be repeated here again for brevity.

Optionally, the apparatus 500 may be a chip. It should be understood that the chip mentioned in the implementations of the present disclosure may also be referred to as a system-level chip, a system chip, a chip system, or a system chip on a chip, etc.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement various methods, acts, and logic block diagrams disclosed in the implementations of the present disclosure. The general purpose processor may be a microprocessor or the processor may be any conventional processor or the like. The acts of the methods disclosed in connection with the implementations of the present disclosure may be directly embodied by execution of a hardware decoding processor, or by execution of a combination of hardware and software modules in a decoding processor. The software modules may be located in a storage medium mature in the field, such as a Random Access Memory, a flash memory, a Read-Only Memory, a Programmable Read-Only Memory, or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration but should not be construed as limitations. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to the terminal device in the implementations of the present disclosure, and the computer program causes a computer to perform the corresponding processes implemented by the terminal device in various methods according to the implementations of the present disclosure, which will not be repeated here again for brevity.

An implementation of the present disclosure further provides a computer program product, including computer program instructions.

Optionally, the computer program product may be applied to the terminal device in the implementations of the present disclosure, and the computer program instructions cause the computer to perform the corresponding processes implemented by the terminal device in various methods according to the implementations of the present disclosure, which will not be repeated here again for brevity.

An implementation of the present disclosure further provides a computer program.

Optionally, the computer program may be applied to the terminal device in the implementations of the present disclosure, and when the computer program is run on a computer, the computer is caused to perform the corresponding processes implemented by the terminal device in various methods according to the implementations of the present disclosure, which will not be repeated here again for brevity.

Those of ordinary skill in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Skilled in the art may use different methods to implement the described functions for each particular application, but such implementation should not be considered to be beyond the scope of the present disclosure.

Those skilled in the art may clearly understand that for convenience and conciseness of description, specific working processes of the systems, apparatuses, and units described above may refer to the corresponding processes in the aforementioned method implementations, and details will not be repeated here.

In several implementations according to the present disclosure, it should be understood that the disclosed systems, apparatuses, and methods may be implemented in other ways. For example, the apparatus implementations described above are only illustrative, for another example, a division of the units is only a logical function division, and there may be other division manners in actual implementation. For example, multiple units or components may be combined or integrated into another system, or some features may be ignored or not executed. In addition, mutual coupling or direct coupling or communication connection shown or discussed may be indirect coupling or communication connection between apparatuses or units through some interfaces, and may be in electrical, mechanical, or other forms.

The units described as separated components may or may not be physically separated, and components shown as units may or may not be physical units, i.e., they may be located in one place or may be allocated over multiple network units. Some or all of the units may be selected according to practical needs to achieve purposes of solutions of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, technical solutions of the present disclosure, in essence, or a part contributing to the existing art, or part of the technical solutions, may be embodied in a form of a software product stored in a storage medium, including several instructions for enabling a computer device (which may be a personal computer, a server, or a network device, etc.) to perform all or part of the acts of the methods described in various implementations of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

The invention claimed is:

1. A wireless communication method, comprising:
   receiving, by a terminal device, first indication information and second indication information from a network device, wherein the first indication information is used for indicating a first number Q1 and the second indication information is used for indicating a second number Q2; and
   determining, by the terminal device, target indication information from the first indication information and the second indication information, and determining a Quasi Co-Located (QCL) relationship between Synchronization Signal Blocks (SSBs) of a serving cell of the terminal device according to the target indication information.

2. The method of claim 1, wherein the Q1 is used for indicating a number capable of being used by the serving cell and the Q2 is used for indicating a number capable of being used by a frequency point where the serving cell is located.

3. The method of claim 2, wherein determining, by the terminal device, the target resource from the first indication information and the second indication information comprises:
determining, by the terminal device, the second indication information as the target indication information.

4. The method of claim 1, wherein the first indication information is carried in a Master Information Block (MIB), and the second indication information is carried in a SIB2.

5. The method of claim 4, wherein the method is used for intra-frequency cell reselection.

6. The method of claim 1, wherein the first indication information is carried in a Master Information Block (MIB), and the second indication information is carried in a Radio Resource Control (RRC) reconfiguration message.

7. The method of claim 6, wherein the method is used for intra-frequency cell measurement.

8. The method of claim 1, wherein determining, by the terminal device, the Quasi Co-Located (QCL) relationship between the Synchronization Signal Blocks (SSBs) of the serving cell of the terminal device according to the target indication information comprises:
determining, by the terminal device, that there is a QCL relationship between the SSBs of the serving cell when the SSBs of the serving cell satisfy a following formula:

$$M1 \bmod(Q) = M2 \bmod(Q)$$

M1 and M2 are numbers of different SSBs of the serving cell, and Q is a number indicated by the target indication information.

9. A terminal device, comprising a processor and a transceiver, wherein the transceiver is configured to receive first indication information and second indication information from a network device, wherein the first indication information is used for indicating a first number Q1 and the second indication information is used for indicating a second number Q2; and
the processor is configured to determine target indication information from the first indication information and the second indication information, and determine a Quasi Co-Located (QCL) relationship between Synchronization Signal Blocks (SSBs) of a serving cell of the terminal device according to the target indication information.

10. The terminal device of claim 9, wherein the Q1 is used for indicating a number capable of being used by the serving cell and the Q2 is used for indicating a number capable of being used by a frequency point where the serving cell is located.

11. The terminal device of claim 10, wherein, the processor is specifically configured to:
determine the second indication information as the target indication information.

12. The terminal device of claim 9, wherein the first indication information is carried in a Master Information Block (MIB), and the second indication information is carried in a SIB2.

13. The terminal device of claim 9, wherein the first indication information is carried in a Master Information Block (MIB), and the second indication information is carried in a Radio Resource Control (RRC) reconfiguration message.

14. The terminal device of claim 9, wherein the processor is specifically configured to:
determine that there is a QCL relationship between the SSBs of the serving cell when the SSBs of the serving cell satisfy a following formula:

$$M1 \bmod(Q) = M2 \bmod(Q)$$

M1 and M2 are numbers of different SSBs of the serving cell, and Q is a number indicated by the target indication information.

15. A network device, comprising: a processor and a transceiver, wherein
the transceiver is configured to send first indication information and second indication information to a terminal device, wherein the first indication information is used for indicating a first number Q1 and the second indication information is used for indicating a second number Q2;
wherein target indication information is determined by the terminal device from the first indication information and the second indication information, and a Quasi Co-Located (QCL) relationship between Synchronization Signal Blocks (SSBs) of a serving cell of the terminal device is determined according to the target indication information.

16. The network device of claim 15, wherein the Q1 is used for indicating a number capable of being used by the serving cell and the Q2 is used for indicating a number capable of being used by a frequency point where the serving cell is located.

17. The network device of claim 16, wherein the second indication information is determined by the terminal device as the target indication information.

18. The network device of claim 15, wherein the first indication information is carried in a Master Information Block (MIB), and the second indication information is carried in a SIB2.

19. The network device of claim 15, wherein the first indication information is carried in a Master Information Block (MIB), and the second indication information is carried in a Radio Resource Control (RRC) reconfiguration message.

20. The network device of claim 15, wherein that there is a QCL relationship between the SSBs of the serving cell is determined by the terminal device when the SSBs of the serving cell satisfy a following formula:

$$M1 \bmod(Q) = M2 \bmod(Q)$$

M1 and M2 are numbers of different SSBs of the serving cell, and Q is a number indicated by the target indication information.

* * * * *